(12) United States Patent
Anschutz et al.

(10) Patent No.: US 10,229,587 B2
(45) Date of Patent: Mar. 12, 2019

(54) PROVIDING MOBILE AD HOC COOPERATIVE COMMUNICATION SYSTEMS AND RELATED DEVICES FOR VEHICLE-TO-VEHICLE COMMUNICATION

(71) Applicant: AT&T Intellectual Property I, L.P., Atlanta, GA (US)

(72) Inventors: Thomas Arnold Anschutz, Conyers, GA (US); Mounire El Houmaidi, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 201 days.

(21) Appl. No.: 14/540,186

(22) Filed: Nov. 13, 2014

(65) Prior Publication Data

US 2015/0070193 A1  Mar. 12, 2015

Related U.S. Application Data

(63) Continuation of application No. 13/606,144, filed on Sep. 7, 2012, now Pat. No. 8,938,199, which is a
(Continued)

(51) Int. Cl.
*G08G 1/01* (2006.01)
*H04W 8/00* (2009.01)
(Continued)

(52) U.S. Cl.
CPC ........... *G08G 1/0141* (2013.01); *G08G 1/012* (2013.01); *G08G 1/0112* (2013.01); *G08G 1/096725* (2013.01); *G08G 1/096775* (2013.01); *G08G 1/096791* (2013.01); *H04W 8/005* (2013.01); *H04W 40/20* (2013.01); *H04W 40/18* (2013.01); *H04W 84/18* (2013.01)

(58) Field of Classification Search
CPC ..... H04W 84/18; H04W 40/20; H04W 4/046; H04W 4/24; H04W 4/02; H04W 4/021; H04W 4/028; H04W 40/18; H04W 16/28; H04W 4/22; H04W 64/003; H04W 72/082; H04W 8/005; H04W 12/08; H04W 16/14; H04W 84/005; H04W 24/02; H04W 24/08
USPC ............ 455/25, 63.4, 436, 440, 441, 456.1, 455/456.6, 457, 502, 509; 370/252, 331, 370/332, 338
See application file for complete search history.

(56) References Cited

U.S. PATENT DOCUMENTS 6,731,940 B1  5/2004 Nagendran
6,961,541 B2  11/2005 Overy et al.
(Continued)

*Primary Examiner* — Natasha W Cosme
(74) *Attorney, Agent, or Firm* — Baker & Hostetler LLP

(57) ABSTRACT

A method of operating a mobile electronic device includes detecting at least one other mobile electronic device within a predetermined distance of the mobile electronic device, and determining a spatial relationship of the at least one other mobile electronic device relative to the mobile electronic device. An ad hoc wireless connection is established with the at least one other mobile electronic device based on the determined spatial relationship. Data may be transmitted to and/or received from the at least one other mobile electronic device over the ad hoc wireless connection based on the determined spatial relationship. Related systems, devices, and computer program products are also discussed in the context of vehicle-to-vehicle communication.

20 Claims, 4 Drawing Sheets

Related U.S. Application Data continuation of application No. 12/885,996, filed on Sep. 20, 2010, now Pat. No. 8,280,308, which is a continuation of application No. 11/548,821, filed on Oct. 12, 2006, now Pat. No. 7,822,384.

(51) Int. Cl.
  *H04W 40/20* (2009.01)
  *G08G 1/0967* (2006.01)
  *H04W 40/18* (2009.01)
  *H04W 84/18* (2009.01)

(56) References Cited

U.S. PATENT DOCUMENTS

| | | |
|---|---|---|
| 7,024,207 B2 | 4/2006 | Gorday et al. |
| 7,444,240 B2 | 10/2008 | Macneille et al. |
| 7,672,270 B2 | 3/2010 | Roggero et al. |
| 7,822,384 B2 | 10/2010 | Anschutz et al. |
| 8,280,308 B2 | 10/2012 | Anschutz et al. |
| 2003/0078062 A1 | 4/2003 | Burr |
| 2003/0141966 A1* | 7/2003 | Strumolo ............... B60Q 1/525 |
| | | 340/435 |
| 2004/0203797 A1 | 10/2004 | Burr |
| 2004/0233855 A1 | 11/2004 | Gutierrez et al. |
| 2005/0053007 A1 | 3/2005 | Bernhardt et al. |
| 2006/0058940 A1* | 3/2006 | Kumagai ......... G08G 1/096716 |
| | | 701/117 |
| 2006/0068822 A1 | 3/2006 | Kalhan |
| 2006/0092939 A1 | 5/2006 | Duggi et al. |
| 2006/0114851 A1 | 6/2006 | Gupta et al. |
| 2006/0188327 A1 | 8/2006 | Moon |
| 2009/0191878 A1 | 7/2009 | Hedqvist et al. |
| 2013/0041576 A1* | 2/2013 | Switkes ................ G08G 1/166 |
| | | 701/123 |

\* cited by examiner

PROVIDING MOBILE AD HOC COOPERATIVE COMMUNICATION SYSTEMS AND RELATED DEVICES FOR VEHICLE-TO-VEHICLE COMMUNICATION

CROSS-REFERENCE TO RELATED APPLICATIONS

The instant application is a continuation of, and claims priority to, U.S. patent application Ser. No. 13/606,144, filed Sep. 7, 2012. U.S. patent application Ser. No. 13/606,144 is a continuation of, and claims priority to, U.S. patent application Ser. No. 12/885,996, filed Sep. 20, 2010, which issued on Oct. 2, 2012, with U.S. Pat. No. 8,280,308. U.S. patent application Ser. No. 12/885,996 is a continuation of, and claims priority to, U.S. patent application Ser. No. 11/548,821 filed Oct. 12, 2006, which issued on Oct. 26, 2010, with U.S. Pat. No. 7,822,384. U.S. patent application Ser. No. 13/606,144 is incorporated by reference herein in its entirety. U.S. patent application Ser. No. 12/885,996 is incorporated by reference herein in its entirety. U.S. patent application Ser. No. 11/548,821 is incorporated by reference herein in its entirety. U.S. Pat. No. 7,822,384 is incorporated by reference herein in its entirety. U.S. Pat. No. 8,280,308 is incorporated by reference herein in its entirety.

TECHNICAL FIELD

The present invention relates to communications networks, and more particularly, to mobile ad hoc networks and related devices.

BACKGROUND

Wireless network topologies that enable wireless nodes (i.e., wireless terminals and/or other mobile electronic devices) to communicate with each other and with fixed networks generally fall into two categories: i) infrastructure-based and ii) infrastructureless. Infrastructure-based networks may be based on the cellular concept, and thus, may require a relatively high level of infrastructure support. More particularly, in an infrastructure-based network, the wireless nodes may communicate through access points (e.g., base stations) connected to the fixed network (e.g., Internet). Typical infrastructure based networks may include GSM networks, UMTS networks, CDMA networks, WLL networks, WLAN, and the like.

In an infrastructureless network, the wireless nodes may communicate directly, rather than through access points or other base stations. One common and increasingly popular infrastructureless network topology is the mobile ad hoc network (MANET). A MANET may include a group of wireless nodes that dynamically form a network with each other and without using a pre-existing fixed network infrastructure. In some cases, wireless nodes of a MANET may be small mobile devices that are relatively limited in term of CPU capability, memory size, and power consumption. For example, cell phones may be equipped with IEEE-802.11 and other wireless LAN technologies to create mobile ad hoc networks.

As noted above, a mobile ad hoc network (MANET) can be set up without using a pre-existing network infrastructure. As such, the wireless nodes of a MANET may be connected by wireless links, and may be free to move randomly. The wireless nodes may also act as routers. A MANET may support traffic types that are different from the traffic types typically found in an infrastructure-based wireless network. For example, MANET traffic types may include: 1) peer-to-peer traffic; 2) remote-to-remote traffic; and 3) dynamic traffic. In peer-to-peer traffic, there may be only one connection, or "hop", between the communicating wireless nodes (i.e., the nodes may be in direct communication). As such, the network traffic between the nodes (in bits/second) may usually be constant. In remote-to remote traffic, there may be two or more hops between communicating wireless nodes, but a stable route may be maintained between the source and destination nodes. Remote-to-remote traffic routing may be used when several nodes remain within range of each other in one area and/or when the nodes move as a group. For dynamic traffic, the communication routes may frequently require reconstruction, as the wireless nodes of the MANET may move around at random. Accordingly, in dynamic traffic routing, each node in the MANET may be required to be aware of changes to the MANET due to entry, departure, and/or movement of the nodes, which may require increased bandwidth, power, and/or complexity.

SUMMARY

According to some embodiments of the present invention, a method of operating a mobile electronic device includes detecting a second mobile electronic device within a predetermined distance of a first mobile electronic device, and determining a spatial relationship of the second mobile electronic device relative to the first mobile electronic device. In some embodiments, the spatial relationship may be determined based on a signal provided by the second mobile electronic device. In other embodiments, the spatial relationship may be determined based on a signal provided by the first mobile electronic device. An ad hoc wireless connection may be established with the second mobile electronic device based on the determined spatial relationship.

In some embodiments, a traveling vector may be determined for the second mobile electronic device based on a signal provided by the second mobile electronic device. The traveling vector may be determined based on changes in a received signal strength of the signal, changes in perceived frequency and/or wavelength of the signal, and/or using a directional antenna array. The traveling vector may indicate the speed, distance, direction of movement, and/or the position of the second mobile electronic device relative to the first mobile electronic device. As such, the ad hoc wireless connection with the second mobile electronic device may be established based on the determined traveling vector.

In other embodiments, data may be transmitted to the second mobile electronic device over the ad hoc wireless connection based on the determined spatial relationship. Also, data may be requested from the second mobile electronic device based on the determined spatial relationship.

In some embodiments, vehicle dynamics data may be transmitted to the second mobile electronics device based on the determined spatial relationship. For example, the determined spatial relationship may indicate that the second mobile electronic device is traveling in a same direction as the first mobile electronic device. As such, vehicle speed data associated with the first mobile electronic device may be transmitted to the second mobile electronic device over the ad hoc wireless connection.

In other embodiments, the determined spatial relationship may indicate that the second mobile electronic device is traveling behind the first mobile electronic device in a same direction as the first mobile electronic device. Accordingly, vehicle braking and/or stability data associated with the first mobile electronic device may be transmitted to the second mobile electronic device over the ad hoc wireless connection.

In some embodiments, the determined spatial relationship may indicate that the second mobile electronic device is traveling adjacent to the first mobile electronic device. As such, vehicular lane-change data associated with the first mobile electronic device may be transmitted to the second mobile electronic device over the ad hoc wireless connection.

In other embodiments, the determined spatial relationship may indicate that the second mobile electronic device is approaching the first mobile electronic device and traveling in an opposite direction as the first mobile electronic device. Accordingly, turn signal data associated with the first mobile electronic device may be transmitted to the second mobile electronic device over the ad hoc wireless connection.

In some embodiments, data from the second mobile electronic device may be received over the ad hoc wireless connection based on the determined spatial relationship.

In other embodiments, vehicle dynamics data for a vehicle associated with the second mobile electronics device may be received from the second mobile electronics device based on the determined spatial relationship. In addition, a control signal may be provided to alter vehicle speed, direction of travel, and/or safety systems of a vehicle associated with the first mobile electronics device based on the received vehicle dynamics data for the vehicle associated with the second mobile electronic device. For example, the control signal may be provided to avoid a collision with the vehicle associated with the second mobile electronic device and/or to provide a cooperative cruise-control function.

In some embodiments, the determined spatial relationship may indicate that the second mobile electronic device is in front of and/or adjacent to the first mobile electronic device. As such, vehicle braking, stability, and/or lane-change data for a vehicle associated with the second mobile electronic device may be received over the ad hoc wireless connection. In addition, a visible and/or audible alert signal may be provided responsive to receiving the vehicle dynamics data for the vehicle associated with the second mobile electronic device.

In other embodiments, the determined spatial relationship may indicate that the second mobile electronic device is traveling in a same direction as the first mobile electronic device. Accordingly, vehicle speed data for a vehicle associated with the second mobile electronic device may be received over the ad hoc wireless connection. In addition, u control signal may be provided to alter a vehicle speed of a vehicle associated with the first mobile electronic device based on the vehicle speed data associated with the second mobile electronic device.

In some embodiments, a third mobile electronic device may be detected within the predetermined distance of the first mobile electronic device, and a spatial relationship of the third mobile electronic device relative to the first mobile electronic device may be determined. A second ad hoc wireless connection may be established with the third mobile electronic device based on the determined spatial relationship thereto.

In other embodiments, first data may be transmitted to the second mobile electronic device over the first ad hoc wireless connection based on the determined spatial relationship thereto. Also, second data may be transmitted to the third mobile electronic device over the second ad hoc wireless connection based on the determined spatial relationship thereto. In addition, the first and second data may be first and second data packets corresponding to a data file, and the first and second data packets may be transmitted in parallel to provide increased transmission bandwidth.

In some embodiments, data may be received from the third mobile electronic device over the second ad hoc wireless connection based on the determined spatial relationship to the third mobile electronic device. The data may be relayed to the second mobile electronic device over the first ad hoc wireless connection based on the determined spatial relationship to the second mobile electronic device.

In other embodiments, the data received from the third mobile electronics device may be vehicle dynamics data for a vehicle associated with the third mobile electronic device. The received vehicle dynamics data may be aggregated with vehicle dynamics data for a vehicle associated with the first mobile electronic device to provide aggregate vehicle data. The aggregate vehicle data may be relayed to the second mobile electronic device over the first ad hoc wireless connection.

In some embodiments, data including addressing information for a destination device may be received at the first mobile electronic device. The ad hoc wireless connection with the second mobile electronic device may be established based on the determined spatial relationship indicating a location of the second mobile electronic device relative to a location of the destination device specified by addressing information.

In other embodiments, a wireless connection may be established with a fixed network access point. Data may be relayed between the fixed network access point and the second mobile electronic device over the wireless data connection and the ad hoc wireless data connection. A location of the first mobile electronic device may also be determined by an authorized party based on a location of the fixed access point.

In some embodiments, either the ad hoc wireless connection with the second mobile electronic device or a wireless connection with a fixed network access point may be established based on current network conditions. In addition, a PLMN connection with a fixed network access point (such as a cellular base station transceiver) or an ad hoc wireless connection with a fixed network access point (such as a Wi-Fi hotspot) may be selectively established based on current network conditions.

According to other embodiments of the present invention, a mobile electronic device includes a controller and a wireless transceiver coupled to the controller. The controller is configured to detect at least one other mobile electronic device within a predetermined distance of the mobile electronic device, and is configured to determine a spatial relationship of the at least one other mobile electronic device relative to the mobile electronic device. The wireless transceiver is configured to establish an ad hoc wireless connection with the at least one other mobile electronic device based on the determined spatial relationship.

Other methods, systems, devices, and/or computer program products according to other embodiments of the invention will become apparent to one with skill in the art upon review of the following drawings and detailed description. It is intended that all such additional methods, systems, devices, and/or computer program products, as well as any combination of the above embodiments, be included within this description, be within the scope of the present invention, and be protected by the accompanying claims.

DETAILED DESCRIPTION OF EMBODIMENTS OF THE INVENTION

Figure 1:
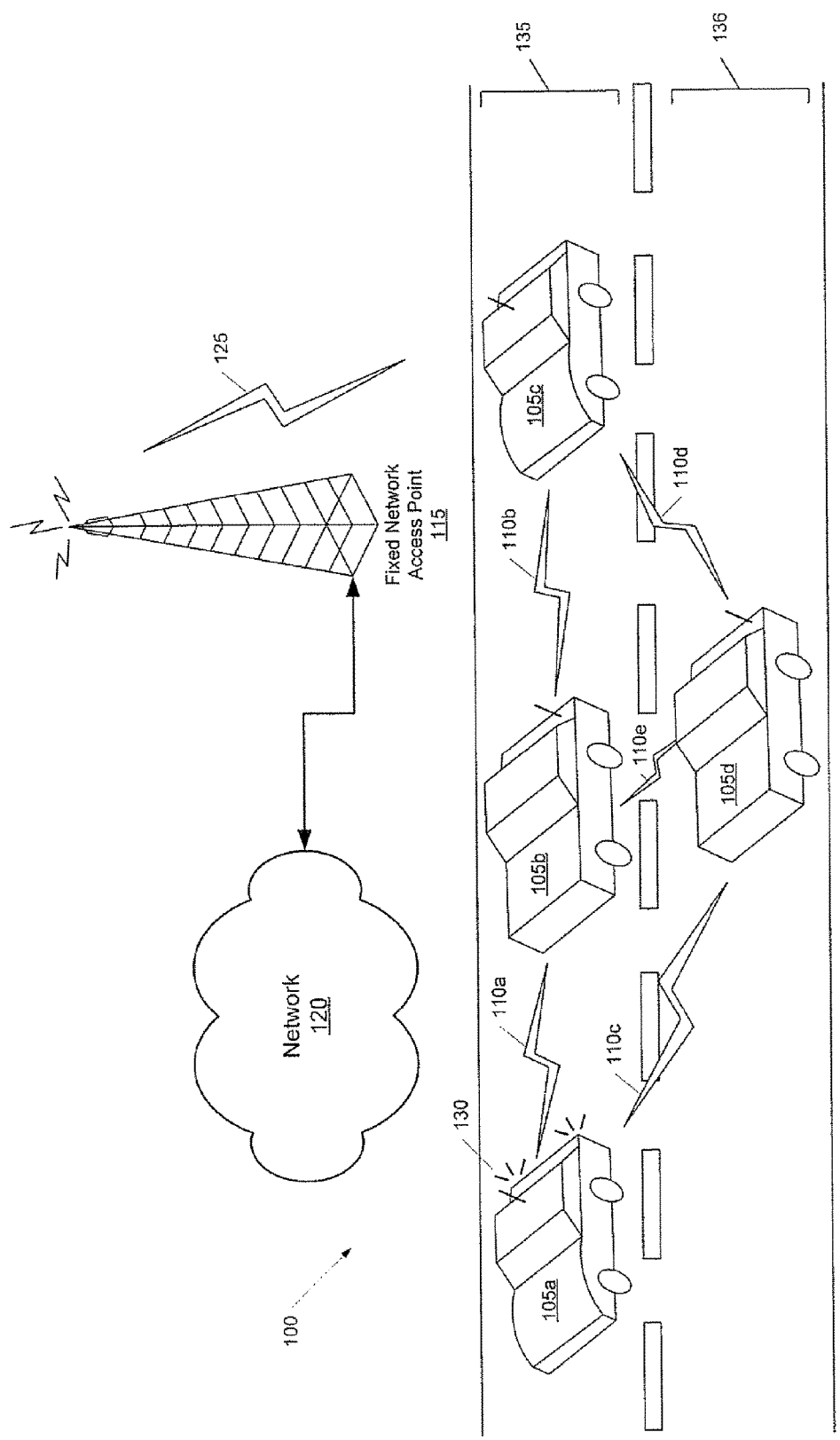
FIG. 1 is a block diagram illustrating a mobile ad hoc cooperative communication system and related devices according to some embodiments of the present invention.

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or includes any and all combinations of one or more of the associated listed items.

It will be understood that, although the terms first, second, etc. may be used herein to describe various elements, these elements should not be limited by these terms. These terms are only used to distinguish one element from another. For example, a first mobile electronic device could be termed a second mobile electronic device, and, similarly, a second mobile electronic device could be termed a first mobile electronic device without departing from the teachings of the disclosure.

The present invention is described hereinafter with reference to flowchart and/or block diagram illustrations of systems, methods, and computer program products in accordance with some embodiments of the invention. These flowchart and/or block diagrams further illustrate exemplary operations of the system and device architectures of FIGS. 1 to 5. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to some embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program nodules may also be implemented using discrete hardware components, one or more application specific integrated circuits (ASICs), or a programmed digital signal processor or microcontroller.

As used herein, the term "mobile electronic device" may include any device that is capable of receiving and displaying audio and/or video content, and may include a satellite or cellular radiotelephone with or without a multi-line display; a Personal Communications System (PCS) terminal that may combine a cellular radiotelephone with data processing, facsimile and data communications capabilities; a FDA that can include a radiotelephone, pager, Internet/ intranet access, Web browser, organizer, calendar and/or a global positioning system (GPS) receiver; a notebook or laptop computer that includes a modem or other network transceiver; and/or a vehicle integrated with and/or otherwise associated with such a mobile electronic device.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

FIG. 1 illustrates a mobile ad hoc cooperative communication system and related devices and methods according to some embodiments of the present invention. Referring now to FIG. 1, mobile ad hoc cooperative communication system 100 includes a plurality of mobile electronic devices, illustrated in FIG. 1 as automobiles 105a-105d. The automobiles 105a-105d each include a wireless local area network interface transceiver that is configured to support formation of one or more ad hoc wireless connections 110a-110e. The wireless local area network interface transceiver, for example, may be provided according to a Wi-Fi standard and/or a Bluetooth standard. In addition, one or more of the automobiles 105a-105d may include an infrared (IR) transceiver configured to establish the ad hoc wireless connections 110a-110d using infrared couplings. To reduce signal interference that may occur during data transmission between the automobiles 105a-105d, the ad hoc wireless connections 110a-110e may be established using different frequencies, directional antenna arrays, and/or spread-spectrum techniques, such as spread-spectrum frequency hopping. Such techniques are well-known in the art and will not be discussed further herein.

The automobiles 105a-105d may be configured to detect each other and/or one or more other mobile electronic devices within a predetermined distance. For example, the automobile 10% may be configured to detect and/or discover other automobiles 105b and 105d within a transmission range of its wireless network transceiver based on respective signals received from the automobiles 105b and 105d, for instance, using discovery techniques that are well-known in the art. The automobiles 105a-105d may also be configured to determine relative spatial relationships between detected ones of the automobiles 105a-105d and/or other detected mobile electronic devices. The spatial relationships may also be determined based on respective signals provided by the automobiles 105a-105d. For example, the automobile 105a may be configured to provide a signal, such as a radar signal, and may determine the relative spatial positions of the automobile 105b and 105d based on the signal provided by the automobile 105a. In addition, the automobile 105a may be configured to determine the relative spatial positions of the automobiles 105b and 105d based on respective signals provided by the automobiles 105b and 105d. As such, the automobiles 10%-105d may be configured to selectively establish the ad hoc wireless connections 110a-110e based on the determined spatial relationships.

In addition, the automobiles 105a-105d may be configured to determine traveling vectors for the detected ones of the automobiles 105a-105d and/or other detected mobile electronic devices. For example, the automobile 105a may determine traveling vectors for the detected automobiles 105b and/or 105d relative to the automobile 105a. The traveling vectors may indicate the speed, distance, direction of movement, and/or positions of the detected automobiles 105b and 105d relative to the automobile 105a. More particularly, one traveling vector may indicate that automobile 105b is traveling in the same direction and behind automobile 105a at 55 mph in the same lane 135, while another traveling vector may indicate that automobile 105d is traveling in the same direction and behind automobile 105a at 60 mph in an adjacent lane 136. The automobile 105a may be configured to determine the traveling vectors based on changes in received signal strength of the signals from automobiles 105b and 105d and/or changes in perceived frequency and/or wavelength of the signals (i. e., Doppler shift principles). In addition, the automobile 105a may be configured to determine the traveling vectors for the detected automobiles 105b and/or 105d using a directional antenna array and/or other techniques.

Accordingly, particular data may be transmitted and/or received between the mobile electronic devices 105a-105d over the ad hoc wireless connections 110a-110e based on the determined spatial relationships and/or traveling vectors. For example, the automobile 105a may establish ad hoc wireless connections 110a and 110c with the automobiles 105b and 105d based on the determined traveling vectors indicating that the automobiles 105b and 105d are traveling in the same direction and behind the automobile 105a. Accordingly, in the event that the automobile 105a performs an emergency braking maneuver (as indicated by the illuminated brake lights 130), the automobile 105a may selectively transmit data, such as particular vehicle dynamics data, to the automobiles 10% and 105d based on their determined spatial relationships. More particularly, the automobile 105a may transmit braking/deceleration data to the automobile 105b over the ad hoc wireless connection 110a based on the determined traveling vector indicating that automobile 105b is traveling directly behind automobile 105a. In addition, the automobile 105a may transmit vehicle stability data, such as yaw velocity, squat, dive, and/or lane-change data, to the automobile 105d over the ad hoc wireless connection 110c based on the determined traveling vector indicating that automobile 10% is traveling adjacent to automobile 105a.

Upon receiving the data from the automobile 105a over the ad hoc wireless connection 110a, the automobile 105b may be configured to provide a visible and/or audible alert signal based on the received data. More particularly, the automobile 105b may provide an alert signal to its driver indicating that the automobile 105a directly ahead is rapidly decelerating. In addition, in some embodiments, the automobile 105b may provide a control signal to alter the vehicle speed and/or direction of travel of the automobile 105b based on the received vehicle dynamics data from the automobile 105a in order to avoid a collision. The control signal may be provided in conjunction with radar and/or camera based system employed by automobile 105b in order to detect stationary and/or other objects which may not provide a recognizable signal. As such, the automobile 105b may safely avoid a collision based on the received vehicle dynamics data from the automobile 105a. Also, the control signal may be provided in order to ready safety systems, such as airbags and/or seatbelt pretensioners, of the automobile 105b in the event that a collision is imminent.

Likewise, upon receiving the data from the automobile 105a over the ad hoc wireless connection 110c, the automobile 105d may be configured to provide a visible and/or audible alert signal based on the received vehicle dynamics data. More particularly, the automobile 105d may provide an alert signal to its driver indicating that the automobile 105*a* is unstable and/or is swerving into the lane 136. In addition, the automobile 105*d* may provide a control signal to alter vehicle speed, direction of travel, and/or safety systems associated with automobile 105*d* based on the received vehicle stability data from automobile 105*a*. Accordingly, the automobile 105*d* may decelerate and/or steer around automobile 105*a* based on the received vehicle dynamics data from the automobile 105*a* to avoid a collision.

In other words, automobile 105*a* may be configured to detect and determine the relative spatial positions of a plurality of automobiles 105*b*-105*d* within a predetermined range of automobile 105*a*, and may selectively establish ad hoc wireless connections 110*a* and 110*c* with the automobiles 105*b* and 105*d* based on the determined spatial positions. In addition, automobile 105*a* may selectively transmit particular data to automobiles 105*b* and/or 105*d* based on the determined spatial relationships thereof. For example, in order to avoid an accident, the driver of automobile 105*a* may rapidly apply the brakes and/or swerve into an adjacent lane 136. As such, automobile 10% may transmit braking data to automobile 105*b* over the ad hoc wireless connection 110*a* based on the determination that automobile 105*b* is traveling behind automobile 105*a* in the same lane 635 at a similar speed, and may transmit lane change data to automobile 105*d* over the ad hoc wireless connection 110*c* based on the determination that automobile 105*d* is traveling behind automobile 105*a* in the adjacent lane 136 at a greater relative speed. In addition, upon receiving the respective data from automobile 105*a*, automobiles 105*b* and/or 105*d* may provide a visible and/or audible alert signal and/or may provide a control signal to alter vehicle speed, direction of travel, and/or safety systems of the automobiles 105*b* and/or 105*d* to avoid a collision with automobile 150*a*.

Also, although not illustrated in FIG. 1, the automobile 10% may be configured to detect another automobile within a predetermined distance and determine a traveling vector indicating that the other automobile is approaching the automobile 105*a* from an opposite direction. As such, the automobile 105*a* may establish an ad hoc wireless connection with the approaching automobile based on the determined traveling vector, and may transmit turn-signal data to the approaching automobile, for example, in a situation where the automobile 105*a* is preparing to make a left-hand turn and/or other turn in a direction that may cross the path of the approaching automobile. Upon receiving the turn signal data, the approaching automobile may be configured to provide an audible and/or visible alert signal to its driver and/or may provide a control signal to alter its speed to avoid a collision with the automobile 105*a*.

In addition, the automobiles 105*a*-105*d* may be configured to establish the plurality of ad hoc wireless connections 110*a*-110*e* to provide a cooperative cruise control function. For example, the automobile 105*a* may detect the automobile 105*b* within a predetermined distance, and may determine a traveling vector indicating that automobile 105*b* is traveling in the same lane 135 behind automobile 105*a* at a substantially similar speed. As such, automobile 10% may establish the ad hoc wireless connection 110*a* with automobile 105*b* based on the determined spatial relationship, and may transmit current vehicle speed data for the automobile 105*a* to the automobile 105*b* over the ad hoc wireless connection 110*a*. Similarly, the automobile 105*c* may detect the automobile 105*b* within a predetermined distance, and may determine a traveling vector indicating that the automobile 105*b* is traveling in the same lane 135 in front of the automobile 105*c*. As such, the automobile 105*c* may establish an ad hoc wireless connection 110*b* with automobile 105*b*, and may transmit a request for vehicle speed data associated with automobile 105*b* over the ad hoc wireless connection 110*b*.

Upon receiving the vehicle speed data from automobile 105*a* over the ad hoc wireless connection 110*a*, the automobile 105*b* may provide a prompt asking its driver whether he would like to participate in a cooperative speed arrangement with the automobile 105*a*. If the driver accepts, the automobile 105*b* may provide a control signal to alter the vehicle speed of the automobile 105*b* to match the speed of the automobile 105*a* based on the vehicle speed data received over the ad hoc wireless connection 110*a*. As such, the automobile 105*b* may speed up or slow down in order to maintain a predetermined distance between automobile 105*b* and automobile 105*a*. Similarly, responsive to receiving the request from the automobile 105*c* over the ad hoc wireless connection 110*b*, the automobile 105*b* may transmit its vehicle speed data to the automobile 105*c* over the ad hoc wireless connection 110*b*. As such, the automobile 105*c* may provide a prompt asking its driver whether she would like to participate in the cooperative speed arrangement, and responsive to receiving an acceptance from the driver, the automobile 105*c* may alter its vehicle speed to match the vehicle speed of the automobile 105*b* based on the vehicle speed data received over the ad hoc wireless connection 110*b*.

The automobiles 105*a*, 105*b*, and/or 105*c* may also be configured to maintain a sufficient distance between each other so as to reap fuel efficiency benefits that may be provided by reduced aerodynamic drag (i.e., a "drafting effect") due to a proximity to the lead automobile 105*a*. For example, the automobiles 105*a*, 105*b*, and/or 105*c* may be configured to repeatedly transmit vehicle speed data such that acceleration and/or deceleration of a lead automobile may be determined by a following automobile based on the transmitted speed data. As such, the automobiles 105*a*, 105*b*, and/or 10% may be configured to provide control signals based on the received vehicle speed data to increase or reduce speed to maintain a desired distance therebetween. Also, one or more of the automobiles 105*a*, 105*b*, and/or 105*c* may include a radar-based vehicle detection system, for example, in order to detect other vehicles and/or objects that may enter the lane 135. For example, if a vehicle that does not provide a recognizable signal swerves into the lane 135 between the automobiles 105*a* and 105*b*, the automobile 105*b* may detect the presence of the other vehicle using a radar-based sensor, and may thereby adjust its speed in order to avoid collision with the other vehicle.

In addition, each of the automobiles 105*a*-105*d* may be configured to aggregate vehicle data, such as vehicle dynamics data, received from one or more of the automobiles 105*a*-105*d* with its own data to provide aggregate vehicle data. For example, the aggregate vehicle data may include aggregate speed and/or distance data associated with automobiles traveling in the same direction. The automobiles 105*a*-105*d* may also be configured to relay the aggregate data between each other over the ad hoc wireless connections 110*a*-110*e*. More particularly, as shown in FIG. 1, the automobile 105*a* may relay its vehicle speed data to the automobile 105*b* over the ad hoc wireless connection 110*a*, and the automobile 105*b* may relay a set of speed data including the speed of automobile 105*b* as well as the speed of automobile 105*a* to the automobile 105*c* over the ad hoc wireless connection 110*b*. The automobile 10% may thereby determine current traffic conditions ahead based on the received aggregate speed data. For example, based on the aggregate speed data, automobile 105c may determine that the average speed of the vehicles 105a and 105b ahead is approximately 5 mph, which may indicate significant traffic congestion. In addition, where the aggregate speed data includes aggregate distance data for the automobiles 105a and 105b, the automobile 105c may determine a speed and/or distance that it may maintain to avoid stopping and/or heavy braking, which may provide improved fuel efficiency.

As such, mobile electronic devices, such as the automobiles 105a-105d of FIG. 1, may establish the ad hoc wireless connections 110a-110e based on the determined spatial relationships between the automobiles 105a-105d, and may receive and/or transmit data therebetween to provide cooperative benefits.

Furthermore, as shown in FIG. 1, the mobile ad hoc cooperative communication system 100 may include a fixed network access point 115 connected to a network 120. For example, the fixed network access point 115 may be a cellular base station. In other embodiments, the fixed network access point 115 may be a Wi-Fi wireless access point (WAP). The network 120 may represent a global network, such as the Internet, or other publicly accessible network. The network 120 may also, however, represent a wide area network, a local area network, an Intranet, and/or other private network, which may not be accessible by the general public. In addition, the network 120 may represent a combination of one or more wired and/or wireless public and/or private networks and/or virtual private networks (VPN). As such, one or more of the automobiles 105a-105d may also include a public land mobile network (PLMN) transceiver, and may be configured to establish a wireless connection with the fixed network access point 115 to access the network 120.

More particularly, as shown in FIG. 1, the automobile 105c may establish a wireless connection 125 with the fixed network access point 115. The automobile 105c may also be configured to relay data between the fixed network access point 115 and one or more of the automobiles 105a, 105b, and/or 105d via the ad hoc wireless connections 110a-110e to thereby extend the range of the network 120. For example, the automobile 105a may be involved in an accident in a remote area beyond the range of the fixed network access point 115, and may detect and determine the relative spatial relationship of approaching automobile 105b within its transmission range. The automobile 105a may thereby establish an ad hoc wireless connection 110a with automobile 105b, and may transmit an emergency signal to automobile 105b over the ad hoc wireless connection 110a. Responsive to receiving the emergency signal, automobile 105b, which may also be beyond the range of fixed network access point 115, may detect and determine the relative spatial relationship of approaching automobile 105c, and may establish an ad hoc wireless connection 110b with automobile 105c. The automobile 105b may thereby relay the emergency signal from automobile 105a to automobile 105c via the ad hoc wireless connection 110b. Upon receiving the emergency signal, automobile 105c may determine that it is within the range of fixed network access point 115, and as such, may establish a wireless connection 125 with the fixed network access point 115 and may relay the emergency signal from automobile 10% to the fixed network access point 115. The fixed network access point 115 may then provide the emergency signal to the appropriate emergency personnel via the network 120. As such, the automobiles 105b and/or 105c may be used to extend the range of the network 120 to the automobile 105a and/or other mobile electronic devices that are beyond the range of the fixed network access point 115.

In addition, the automobile 105c may be configured to provide its location to an authorized party using the wireless connection 125 with the fixed network access point 115. More particularly, the automobile 105c may transmit an identifying signal to the fixed network access point 115, and as such, an approximate location of the automobile 105c may be determined based on the location of the fixed network access point 115. Thus, law enforcement and/or other authorized parties may locate the automobile 105c based on the known location of the fixed network access point 115.

Also, in some embodiments, data to be transmitted from automobile 105a may exceed the bandwidth provided by any one of the ad hoc wireless connections 110a-110e. As such, the automobile 105a may be configured to break the desired data into first and second portions or packets, and may be configured to transmit the first and second packets in parallel using the detected automobiles 105b, 105c, and/or 105d to provide increased transmission bandwidth. More particularly, as shown in FIG. 1, a first packet may be transmitted over the ad hoc wireless connection 110a to automobile 105b, which may relay the first packet to automobile 105c via the ad hoc wireless connection 110b. Similarly, the second data packet may be transmitted over the ad hoc wireless connection 110c to automobile 105d which may relay the second data packet to automobile 105c via ad hoc wireless connection 110d. The automobile 105c may relay the first and second data packets to the fixed network access point 115 via the wireless connection 125. Thus, a plurality of mobile electronic devices, such as the automobiles 105a-105d, may be used to provide increased transmission bandwidth.

Although FIG. 1 illustrates an exemplary mobile ad hoc cooperative communication system according to some embodiments of the present invention, it will be understood that some embodiments of the present invention are not limited to such configuration, but are intended to encompass any configuration capable of carrying out the operations described herein, For example, although illustrated in FIG. 1 with reference to the automobiles 105a-105d, other mobile electronic devices, such as laptop computers, notebook computers, handheld computers, personal communication systems (PCS) terminals, personal digital assistants (PDA), pagers, and/or cellular radio telephones may be configured to establish ad hoc wireless connections with detected mobile electronic devices based on their determined spatial relationships. In addition, it is to be understood that the automobiles 105a-105d may be configured to detect mobile electronic devices and/or determine relative spatial relationships periodically and/or intermittently to dynamically establish the ad hoc wireless connections based on changes in positions of the automobiles 105a-105d.

Figure 2:
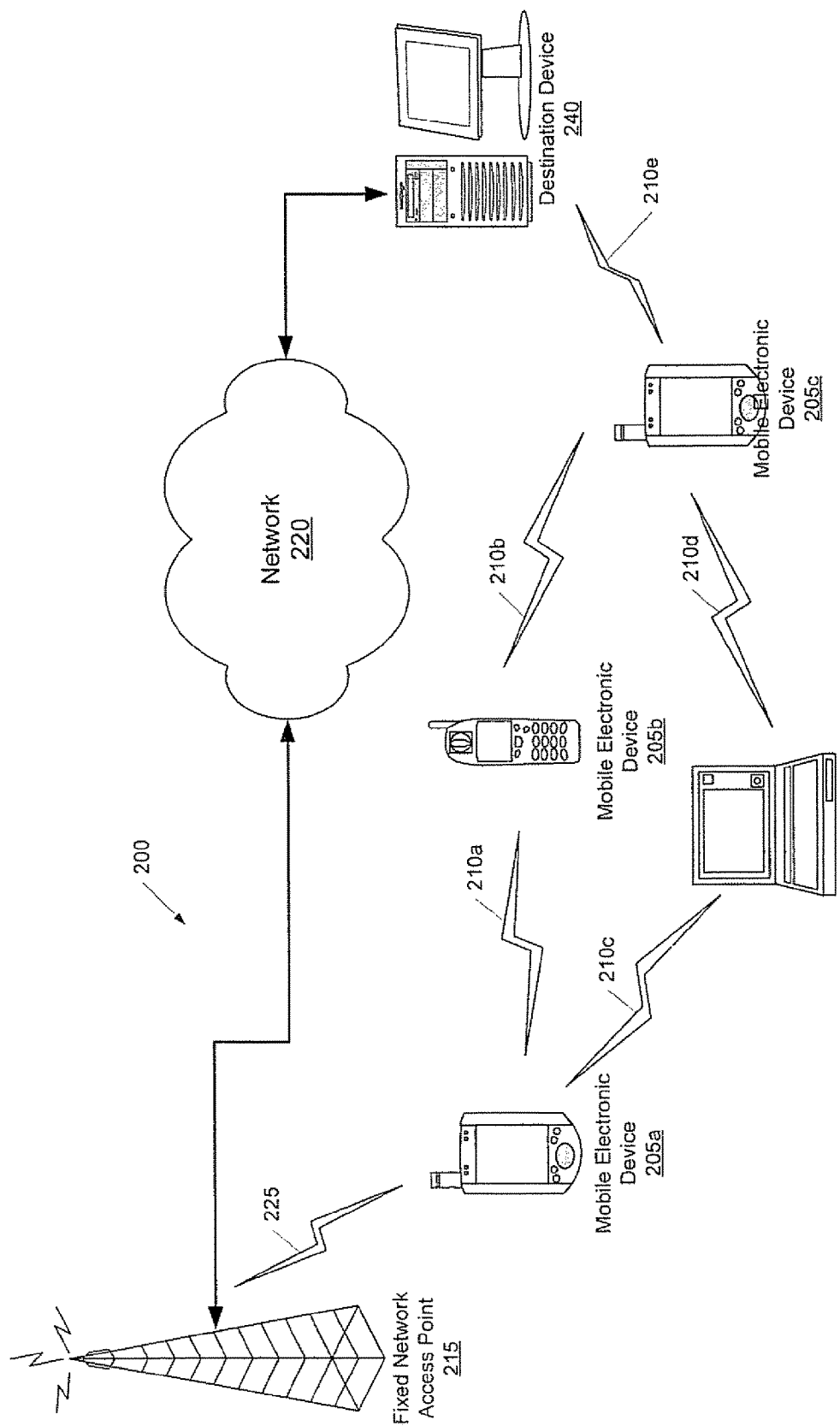
FIG. 2 is a block diagram illustrating a mobile ad hoc cooperative communication system and related devices according to other embodiments of the present invention.

FIG. 2 illustrates mobile ad hoc cooperative communication systems and related devices and methods according to further embodiments of the present invention. Referring now to FIG. 2, a mobile ad hoc cooperative communication system 200 includes a plurality of mobile electronic devices 205a-205d. The mobile electronic devices 205a-205d may be, for example, laptop computers, notebook computers, handheld computers, personal communication systems (PCS) terminals, personal digital assistants (PDA), pagers, and/or radio telephones; however, the mobile electronic devices 205a-205d need not all be identical. For example, mobile electronic devices 205a and 205c may be PDAs, mobile electronic device 20% may be a cellular radio telephone, and mobile electronic device 205d may be a laptop computer. The mobile electronic devices 205a-205d may each include a wireless local area network interface transceiver that is configured to support formation of an ad hoc wireless local area network, and as such, may be configured to establish a plurality or ad hoc wireless connections 210a-210e between the mobile electronic devices 205a-205d. The plurality of ad hoc wireless connections 210a-210e may be a Bluetooth, Wi-Fi, and/or infrared (IR) couplings, as discussed above with reference to FIG. 1. In addition, one or more of the mobile electronic devices 205a-205d may be associated and/or integrated with other mobile electronic devices, such as the automobiles 105a-105d of FIG. 1.

Accordingly, using the respective wireless local area network transceivers, each of the mobile electronic devices 205a-205d may be configured to detect other ones of the mobile electronic devices 205a-205d within a predetermined distance. In addition, the mobile electronic devices 205a-205d may be configured to determine relative spatial relationships between the mobile electronic devices 205a-205d. For example, the mobile electronic device 205a may be configured to discover the mobile electronic devices 205b-205d and determine relative spatial relationships based on respective signals provided by the mobile electronic devices 205b-205d. More particularly, the mobile electronic device 205a may include a directional antenna array, and as such, may determine the spatial relationships of the devices 205b-205d relative to the mobile electronic device 205a based on the signals received at the directional antenna array and/or the received signal strength of the signals. In addition, where one or more of the mobile electronic devices 205a-205d are in motion, traveling vectors for the mobile electronic devices 205a-205d may be determined, for example, based on changes in perceived frequency and/or wavelength of the received signal, i.e., using Doppler shift principles.

As such, the mobile electronic devices 205a-205d may be configured Lo establish the ad hoc wireless connections 210a-210e based on the determined spatial relationships, and may be configured to transmit and/or receive particular data to and/or from particular devices based on the determined spatial relationships. For example, the mobile electronic device 205a may wish to communicate with a destination device 240 that is beyond the transmission range of the mobile electronic device 205a. As such, the mobile electronic device 205a may detect mobile electronic devices 205b and 205d within its transmission range, and may determine that both mobile electronic devices 205b and 205d are closer to the location of the destination device 240 than the mobile electronic device 205a. However, the mobile electronic device 205a may also determine that the mobile electronic device 205b is physically closer to the location of the destination device 240 than the mobile electronic device 205d. As such, the mobile electronic device 205a may establish an ad hoc wireless connection 210a with the mobile electronic device 205b based on its determined spatial relationship, and may transmit the desired data (including addressing information for the destination device 240) to the mobile electronic device 205b over the ad hoc wireless connection 210a.

Responsive to receiving the data from the mobile electronic device 205a via the ad hoc wireless connection 210a, mobile electronic device 205b may detect mobile electronic devices 205d and 205c within a predetermined distance, and may determine that the relative spatial position of the mobile electronic device 205c is closer to the location of the destination device 240 (as specified by the addressing information in the received data) than the mobile electronic device 205d. As such, mobile electronic device 205b may establish an ad hoc wireless connection 210b with mobile electronic device 205c based on the determined spatial relationship. In other words, mobile electronic device 205b may be * configured to dynamically route received data based on the determined spatial relationships of the detected mobile electronic devices 205c and 205d relative to the location of the specified destination device 240. As such, the mobile electronic device 205b may be configured to relay the data from mobile electronic device 205a to mobile electronic device 205c over the ad hoc wireless connection 210b. Upon receiving the data (including the addressing information for the destination device 240) from the mobile electronic device 205b over the ad hoc wireless connection 210b, the mobile electronic device 205c may determine that the destination device 240 is within its transmission range. Thus, the mobile electronic device 205c may establish an ad hoc wireless connection 210e with destination device 240, and may relay the data from mobile electronic device 205a to the destination device 240.

However, in some embodiments, the mobile electronic device 2051, may be configured to determine the next ad hoc wireless connection based on other characteristics of the detected mobile electronic devices 20% and/or 205d. For example, if more of the resources of the mobile electronic device 205c are currently in use than those of the mobile electronic device 205d, the mobile electronic device 205b may select the mobile electronic device 205d as the next-hop participant. In other words, the mobile electronic device 205b may dynamically route the data to the mobile electronic device 205d based on its status as having a least-busy receiver in comparison to mobile electronic device 20%. Also, in some embodiments, the mobile electronic device 205b may be configured to determine a next-hop participant based on the determined spatial relationships indicating that the mobile electronic device 205c is a "leg" in a predetermined path, such as an organized virtual tributary.

In addition, as further illustrated in FIG. 2, the mobile ad hoc cooperative communication system 200 may also include a fixed network access point 215 and network 220. For example, the fixed network access point 215 may be a cellular base station, a Wi-Fi access point, and/or other fixed network access point. The network 220 may represent a global network, such as the Internet, or other publicly accessible network. The network 220 may also, however, represent a wide area network, a local area network, an Intranet, and/or other private network, which may not be accessible by the general public. In addition, the network 220 may represent a combination of one or more wired and/or wireless public and/or private networks and/or virtual private networks (VPN). As such, in some embodiments, the mobile electronic device 205a may be configured to establish a wireless connection 225 with the fixed network access point 215, and may thereby relay data between the fixed network access point 215 and other mobile electronic devices, such as mobile electronic device 205c, over the ad hoc wireless connections 210a and 210b. In other words, the mobile electronic devices 205a and 205b may be used to extend the network 220 to the mobile electronic device 205c and/or other mobile electronic devices that are beyond the range of the fixed network access point 215.

Also, in some embodiments, the data to be transmitted to mobile electronic device 20% may exceed the bandwidth provided by any one of the ad hoc wireless connections 210a-210e. As such, the mobile electronic device 205a may be configured to establish ad hoc wireless connections 210a and 210c with mobile electronic devices 205b and 205d based on their determined spatial relationship relative to mobile electronic device 205c. As such, the mobile electronic device 205a may transmit a first data packet corresponding to a portion of the data file to mobile electronic device 205b via ad hoc wireless connection 210a. Similarly, mobile electronic device 205a may transmit a second data packet corresponding to a portion of the data file to mobile electronic device 205d via ad hoc wireless connection 210c. Accordingly, the mobile electronic devices 205b and 205d may respectively transmit the first and second data packets to mobile electronic device 205c via ad hoc wireless connections 210b and 210d. In other words, the first and second data packets may be transmitted in parallel via ad hoc wireless connections 210a and 210b and via ad hoc wireless connections 210c and 210d to provide increased transmission bandwidth. Accordingly, each of the mobile electronic devices 205a-205d may add capacity LO the network 220. In other words, the effective bandwidth that is available in the mobile ad hoc cooperative communication system 200 may be increased as the number of mobile electronic devices increase, by employing the mobile electronic devices as extensions of the network 220.

Furthermore, still referring to FIG. 2, the mobile electronic device 205a may be configured to selectively establish a wireless connection 225 with the fixed network access point 215 or establish an ad hoc wireless connection with one of the mobile electronic devices 205a-205d based on current network conditions and/or other factors. For example, in some embodiments, the mobile electronic device 205a may wish to communicate with a destination device 240 that is beyond the transmission range of the mobile electronic device 20%. As such, the mobile electronic device 205a may establish a wireless connection 225 with fixed network access point 215, and as such, may access the destination device 240 via the network 220. However, if a relatively large number of mobile electronic devices are attempting to access the network 220 via the fixed network access point 215, it may be difficult for the mobile electronic device 205a to establish the wireless connection 225 with the fixed network access point 215. Under such conditions, the mobile electronic device 205a may be configured to establish the ad hoc wireless connections 210a-210e with one or more other mobile electronic devices, as described above, to access the destination device 240.

For example, the user of the mobile electronic device 205a may be in an area having a relatively high concentration of mobile electronic devices, such as a traffic jam, and may wish to access a destination device 240 coupled to a home network, for example, to preheat an oven, adjust a thermostat, etc. However, the user of the mobile electronic device 205a may be unable to access the fixed network access point 215 due to the number of other mobile electronic devices in the immediate area currently accessing the fixed network access point 215. As such, the mobile electronic device 205a may detect and determine spatial relationships of mobile electronic devices 205b and 205d relative to the location of the destination device 240, and may selectively establish an ad hoc wireless connection with the mobile electronic device 205b, as described above. The mobile electronic device 205a may thereby transmit a control signal over the ad hoc wireless connection 210a to mobile electronic device 205b, which may relay the control signal to the destination device 240 via the mobile electronic device 205c using ad hoc wireless connections 210b and 210e. The mobile electronic device 205a may also be configured to selectively establish the wireless connection 225 with the fixed network access point 215 or the ad hoc wireless connection 210a with the mobile electronic device 205b based on other factors, such as power consumption when remaining battery life is low and/or when beyond the transmission range of the fixed network access point 215.

In addition, one or more of the mobile electronic devices 205a-205d may be configured to selectively establish a wireless connection using the wireless local area network transceiver or the PLMN transceiver based on current network conditions and/or other factors. For example, where a number of mobile electronic devices are attempting to establish wireless connections with a cellular base station, the mobile electronic device 205a may automatically establish an ad hoc wireless connection with a fixed Wi-Fi access point and/or one or more other mobile electronic devices to establish a connection to the destination device 240. In other words, the mobile electronic devices 205a-205d may be multi-network adaptive devices configured to automatically select between the use of ad hoc or cellular wireless connections depending on the current network conditions, availability, reliability, convenience, and/or other factors.

Although FIG. 2 illustrates an exemplary mobile ad hoc cooperative communication system according to some embodiments of the present invention, it will be understood that embodiments of the present invention are not limited to such a configuration, but are intended to encompass any configuration capable of carrying out the operations described herein. For example, although the destination device 240 is illustrated as a fixed device having a wireline connection the network 220, it is to be understood that the destination device 240 may also be a mobile electronic device, such as the mobile electronic devices 205a-205d, and may thus communicate with the network 220 via a wireless connection. In addition, although illustrated as laptops, PDAs, and cellular telephones, it is to be understood that the mobile electronic devices 205a-205d may be integrated into and/or otherwise associated with other mobile electronic devices, such as automobiles, planes, tanks, helicopters, and/or other vehicles. For example, the mobile electronic devices 205a-205d may be carried within respective ones of the automobiles 105a-105d of FIG. 1, and may be configured to interface and/or communicate with the electronic systems of the respective automobiles 105a-105d in some embodiments of the present invention.

Figure 3:
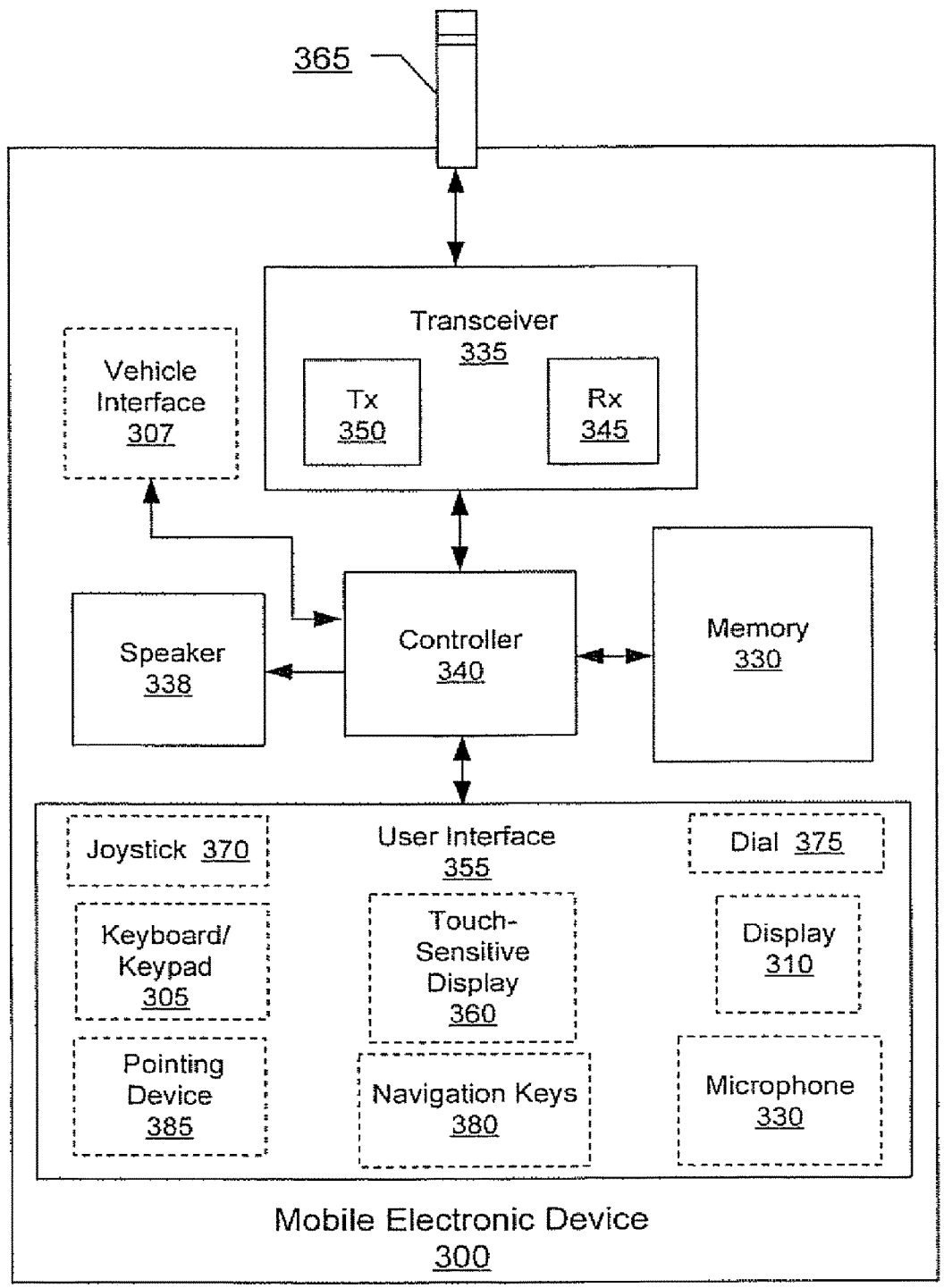
FIG. 3 is a block diagram illustrating a mobile electronic device configured to be used with mobile ad hoc cooperative communication systems according to some embodiments of the present invention.

FIG. 3 illustrates embodiments of a mobile electronic device 300 according to some embodiments of the present invention. In some embodiments, the mobile electronic device 300 may correspond to one of the automobiles 105a-105d of FIG. 1 and/or one of the mobile electronic devices 205a-205d of FIG. 2. As shown in FIG. 3, the mobile electronic device 300 includes a wireless transceiver 335 coupled to an antenna 365, a controller 340, a memory 330, a speaker 338, and a user interface 355. Depending on the functionalities offered by the mobile electronic device 300, the user interface 355 may include a microphone 330, a display 310, a joystick 370, a keyboard/keypad 305, a touch sensitive display 360, a dial 375, navigation keys 380, and/or a pointing device 385 (such as a mouse, trackball, touchpad, etc.). However, additional and/or fewer elements of the user interface 355 may actually be provided. For example, in an automobile user interface, the touch sensitive display 360 may be provided in place of a keypad 305, a pointing device 385.

The transceiver 335 includes a transmitter 350 and a receiver 345. The transceiver 335 includes a wireless local area network interface transceiver configured to establish an ad hoc wireless connection, such as a Bluetooth, Wi-Fi, and/or IR connection, to at least one other mobile electronic device based on a determined spatial relationship between the mobile electronic device 300 and the other mobile electronic device. In addition, the transceiver 335 may also include a PLMN transceiver configured to establish a wireless connection with a fixed network access point, such as a cellular base station or a Wi-Fi hotspot. While a single antenna 365 is illustrated in FIG. 3 by way of example, separate antennas may be provided for the wireless network interface transceiver and/or the PLMN transceiver. Alternatively, multiple antennas may be shared by the PLMN transceiver and the wireless network interface transceiver, and/or multiple antennas may be provided for one or both of the PLMN transceiver and wireless network interface transceiver. In some embodiments, the antenna 365 may be a directional antenna array configured to be used to determine a relative spatial relationship between the mobile electronic device 300 and one or more other mobile electronic devices, as will be discussed in greater detail below.

Still referring to FIG. 3, the controller 340 is coupled to the transceiver 335, the memory 330, the speaker 338, and the user interface 355. The controller 340 may be, for example, a commercially available or custom microprocessor that is configured to coordinate and manage operations of the transceiver 335, the memory 330, the speaker 338, and the user interface 355. As such, the controller 340 may be configured to detect at least one other mobile electronic device within a predetermined distance of the mobile electronic device 300. For example, the controller 340 may be configured to detect the other mobile electronic device based on a signal received from the other mobile electronic device via the transceiver 335, for instance, using known discovery techniques.

In addition, the controller 340 may be configured to determine a spatial relationship of the detected mobile electronic device relative to the mobile electronic device 300. For instance, the controller 340 may be configured to determine the spatial relationship based on the signal provided by the other mobile electronic device using a directional antenna array, such as the antenna 365. Also, in some embodiments, the controller 340 may be configured to determine a traveling vector including speed, distance, direction of movement, and/or relative positional information for the other mobile electronic device based on the signal provided therefrom. The controller 340 may be configured to determine the traveling vector based on, for example, changes in a received signal strength of the signal, changes in perceived frequency and/or wavelength of the signal (i.e., Doppler shift principles), and/or using a directional antenna array.

Accordingly, based on the determined spatial relationship, the transceiver 335 may be configured to establish an ad hoc wireless connection with the other mobile device, and may be configured to transmit and/or receive particular data over the ad hoc wireless connection based on the determined spatial relationship. For example, where the mobile electronic device 300 is integrated and/or otherwise associated with a vehicle, such as one of the automobiles 105a-105d of FIG. 1, the transceiver 335 may be configured to transmit particular vehicle dynamics data to other vehicles within a predetermined distance of the mobile electronic device 300 over respective ad hoc wireless connections based 011 their determined spatial relationships and/or traveling vectors.

More particularly, the transceiver 335 may transmit braking data to a vehicle traveling behind the mobile electronic device 300 in a same direction, and may transmit lane-change data to a vehicle traveling adjacent the mobile electronic device 300. In addition, the transceiver 335 may be configured to transmit vehicle speed data to one or more other vehicles, which may be used to provide a cooperative cruise control arrangement, improved fuel efficiency, and/or to indicate traffic conditions and/or congestion.

Similarly, the transceiver 335 may be configured to receive vehicle dynamics data from one or more vehicles within a predetermined distance of the mobile electronic device 300 over respective ad hoc wireless connections based on the relative spatial relationship of the mobile electronic device 300 to the other vehicles. The mobile electronic device 300 may provide an indication of the received vehicle dynamics data to a user via the user interface 355. For example, responsive to receiving emergency braking data via the transceiver 335 from a vehicle traveling in front of the mobile electronic device 300, the controller 340 may provide a visible and/or audible alert signal via the user interface 355 and/or the speaker 338.

In addition, in some embodiments, the mobile electronic device 300 may include a vehicle interface 307. As such, the controller 340 may be configured to provide a control signal to alter vehicle speed, direction of travel, and/or safety systems via the vehicle interface 307 based on the vehicle dynamics data received via the transceiver 335 to avoid a collision. In addition, the controller 340 may be configured to provide a control signal via the vehicle interface 307 to alter vehicle speed to provide a cooperative cruise control function based on vehicle speed data received from one or more other vehicles via the transceiver 335. The controller 340 may also be configured to provide vehicle control signals using the vehicle interface 307 in conjunction with radar- and/or camera-based vehicle systems to detect stationary and/or other objects to avoid a collision therewith. Furthermore, the controller 340 may be configured to aggregate and/or average vehicle data for one or more vehicles received via the transceiver 335, which may be used to indicate traffic congestion ahead and/or to determine a vehicle speed to avoid heavy braking based on the aggregate vehicle data, which may thereby provide improved fuel efficiency.

Still referring to FIG. 3, the mobile electronic device 300 may also be configured to relay data received via the receiver 345 to one or more other mobile electronic devices based on their determined spatial relationships. For example, the mobile electronic device 300 may receive data including addressing information for a destination device via the transceiver 335, and the controller 340 may be configured to forward the received data to one or more other mobile electronic devices by establishing one or more ad hoc wireless connections with the mobile electronic devices based on their determined spatial relationships relative to the location of the destination device specified by the addressing information in the received data. In other words, the controller 340 may be configured to dynamically route received data to a destination device based on the relative positions and/or traveling vectors of other mobile electronic devices within the transmission range of the transceiver 335. For example, the controller 340 may be configured to establish a next ad hoc wireless connection with a mobile electronic device based on the position of the device relative to both the electronic device 300 and to the location of the destination device. The next ad hoc wireless connection may be established with a device furthest from the mobile electronic device 300 to reduce and/or minimize the number of ad hoc wireless connections (or "hops") that may be required to relay the data to the destination device. In addition and/or alternatively, the controller 340 may be configured to determine the next ad hoc wireless connection based on which of the mobile electronic devices within the range of the transceiver 335 has a least busy receiver, and/or based on the determined spatial relationships indicating that a particular mobile electronic device is to be used as a "leg" in a predetermined path.

Also, the mobile electronic device 300 may be configured to establish a wireless connection with a fixed network access point, such as a cellular base station and/or a Wi-Fi "hotspot". For example, the controller 340 may be configured to automatically establish a wireless connection with either a cellular base station or a Wi-Fi access point based on current network congestion conditions. In addition, the mobile electronic device 300 may be configured to relay data between the fixed network access point and one or more other mobile electronic devices over respective ad hoc wireless connections established based on the relative spatial positions of the other mobile electronic devices. As such, the mobile electronic device 300 may be configured to extend a fixed network, for example, to vehicles and/or other mobile devices that may be beyond the range of a fixed network access point. For instance, a vehicle involved in an accident in a remote area may relay an emergency signal to the fixed network access point via the mobile electronic device 300 and/or other mobile electronic devices, such as. In addition, the mobile electronic device 300 may be configured to access a destination device using a wireless connection with the fixed network access point and/or ad hoc wireless connections with one or more other mobile electronic devices, for example, based on current network conditions, power consumption, reliability, convenience, and/or other factors.

Moreover, by using the mobile electronic device 300 as a relay, the mobile electronic device 300 may be configured to add capacity to a fixed and/or mobile ad hoc network. For example, in conjunction with other mobile electronic devices, the mobile electronic device 300 may be configured to receive data via the receiver 345 and transmit the received data via the transmitter 350 to other devices to provide and/or maintain data transmission speeds even when beyond the range of one or more fixed network access points. Accordingly, the effective bandwidth in a wireless network may be increased as the number of users increase by employing the mobile electronic device 300 and other mobile electronic devices as extensions of the network.

Although FIG. 3 illustrates an exemplary mobile electronic device that may be used in mobile ad hoc cooperative networks according to some embodiments of the present invention, it will be understood that embodiments of the present invention are not limited to such a configuration, but are intended to encompass any configuration capable of carrying out the operations described herein. For example, although the memory 330 is illustrated as a separate component from the controller 340, the memory 330 or portions thereof may be considered as part of the controller 340. More generally, while particularly functionalities are shown in particular blocks by way of illustration, functionalities of different blocks and/or portions thereof may be combined, divided, and/or eliminated.

Figures 4, 5:
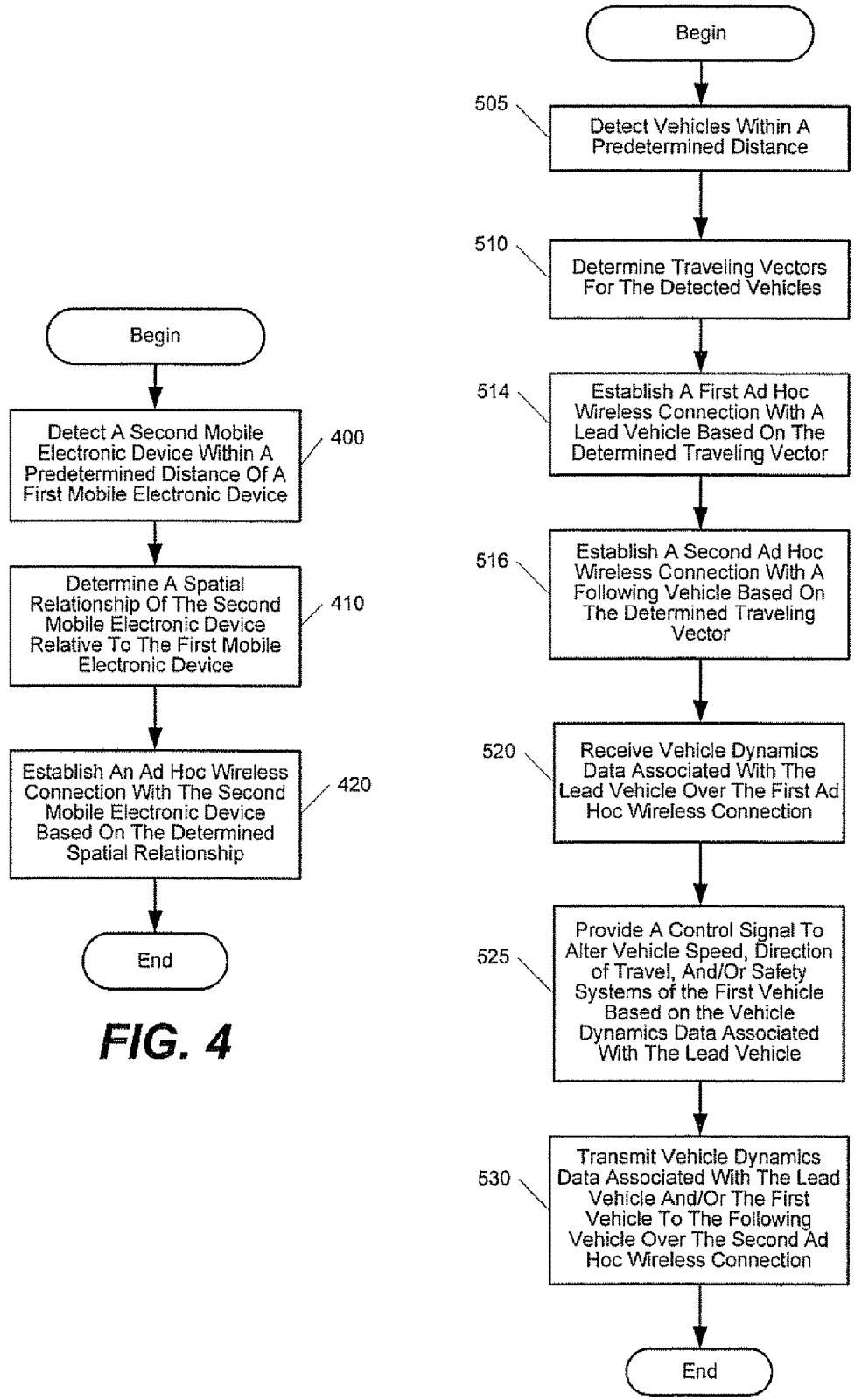
FIGS. 4 and 5 are flowcharts illustrating exemplary operations that may be performed by mobile electronic devices in mobile ad hoc cooperative communication systems according to some embodiments of the present invention.

FIG. 4 is a flowchart illustrating exemplary operations that may be performed by a mobile electronic device, such as the mobile electronic device 300 of FIG. 3, to provide mobile ad hoc cooperative communication systems according to some embodiments of the present invention. Referring now to FIG. 4, operations begin at Block 400 when a second mobile electronic device is detected within predetermined distance of a first mobile electronic device. For example, the first mobile electronic device may discover the second mobile electronic device based on a signal or beacon provided by the second mobile electronic device. Such discovery techniques are well known in the art and will not be discussed further herein. At Block 410, a spatial relationship of the second mobile electronic device relative to the first mobile electronic device is determined. The spatial relationship may also be determined based on a signal provided by the second mobile electronic device, for example, using a received signal strength of the signal and/or using a directional antenna array. In addition, a traveling vector for the second mobile electronic device, including speed, distance, direction of movement, and/or position of the second mobile electronic device relative to the first mobile electronic device, may be determined based on the signal provided from the second mobile electronic device. For example, in some embodiments, changes in perceived frequency and/or wavelength of the received signal (i.e., Doppler shift principles) may be used to determine a traveling vector for the second mobile electronic device. However, in other embodiments, the spatial relationship and/or traveling vector of the second mobile electronic device may be determined based on a signal provided by the first mobile electronic device, for example, using radar principles.

Still referring to FIG. 4, an ad hoc wireless connection is established with the second mobile electronic device based on the determined spatial relationship at Block 420. As such, particular data may be transmitted to and/or received from the second mobile electronic device based on its relative position to the first mobile electronic device. For example, where the first and second mobile electronic devices are integrated and/or associated with respective vehicles, vehicle braking data may be transmitted from the first mobile electronic device to the second mobile electronic device over the ad hoc wireless connection when the determined spatial relationship indicates that the second mobile electronic device is traveling behind the first mobile electronic device in a same direction. On the other hand, when the determined spatial relationship indicates that the second mobile electronic device is traveling next to the first mobile electronic device in an adjacent lane, steering and/or lane change data for the vehicle associated with the first mobile electronic device may be transmitted to the second mobile electronic device over the ad hoc wireless connection based on the determined spatial relationship. In addition, the ad hoc wireless connection may be established with the second mobile electronic device based on the spatial relationship of the second mobile electronic device relative to a destination device. As such, the second mobile electronic device may be used to relay data from the first mobile electronic device provided over the ad hoc wireless connection to the destination device.

FIG. 5 is a flowchart illustrating exemplary operations that may be performed by a mobile electronic device integrated and/or associated with a vehicle, such as one of the automobiles 105a-105d of FIG. 1, to provide mobile ad hoc cooperative communication systems according to further embodiments of the present invention. Referring now to FIG. 5, operations begin when one or more vehicles are detected within a predetermined distance of a first vehicle at Block 505. The vehicles may be detected, for example, based on signals provided by the respective vehicles and/or based on a signal provided by the first vehicle, such as a radar signal. At Block 510, traveling vectors are determined for the detected vehicles. The traveling vectors may indicate the speed, distance, direction of movement, and/or positions of the detected vehicles relative to the first vehicle. The traveling vectors may be determined based on changes in received signal strength of the signals provided by the vehicles, changes in perceived frequency and/or wavelength of the signals provided by the vehicles, and/or using a directional antenna array. Based on the determined traveling vectors, ad hoc wireless connections are established with one or more of the detected vehicles. More particularly, a first ad hoc wireless connection is established with a lead I vehicle traveling ahead of the first vehicle at Block 514, and a second ad hoc wireless connection is established with a following vehicle traveling behind the first vehicle at Block 516. As such, the first vehicle may be between the lead vehicle and the following vehicle. Accordingly, vehicle data may be transmitted between the three vehicles to provide cooperative benefits to all of the vehicles.

More particularly, at Block 520, vehicle dynamics data associated with the lead vehicle is received over the first ad hoc wireless connection based on the determined traveling vector. For example, based on the position of the first vehicle behind the lead vehicle, braking and/or stability data for the lead vehicle may be received over the ad hoc wireless connection, which may be used by the first vehicle to avoid collision with the lead vehicle. In addition, vehicle speed data associated with the lead vehicle may be received over the first ad hoc wireless connection, for example, for use in improved gas efficiency and/or a cooperative cruise control function. At Block 525, a control signal is provided to alter speed, direction of travel, and/or safety systems of the first vehicle based on the vehicle dynamics data associated with the lead vehicle received over the first ad hoc wireless connection. For example, if the received vehicle dynamics data indicates heavy and/or emergency braking by the lead vehicle, a control signal may be provided to apply the brakes of the first vehicle to avoid a collision with the lead vehicle. Also, a control signal may be provided to alter the steering of the first vehicle to steer around the lead vehicle, and/or a control signal may be provided to activate the seatbelt pretensioners in the first vehicle in anticipation of a collision with the lead vehicle. In addition, speed data received from the lead vehicle may be used to provide a cooperative cruise control function. More particularly, based on the vehicle speed data for the lead vehicle, a control signal may be provided to alter the vehicle speed of the first vehicle to match the vehicle speed of the lead vehicle and/or to maintain a predetermined distance between the first vehicle and lead vehicle. Depending on the predetermined distance, the first vehicle may benefit from improved fuel efficiency, for example, based on a "drafting effect" with the lead vehicle.

At Block 530, vehicle dynamics data associated with the lead vehicle and/or vehicle dynamics data associated with the first vehicle is transmitted to the following vehicle over the second ad hoc wireless connection. For example, vehicle speed data associated with the first vehicle may be transmitted to the following vehicle over the second ad hoc wireless connection so that the following vehicle may match the vehicle speed of the first vehicle to participate in the cooperative cruise control arrangement. In addition, the transmitted vehicle dynamics data may be aggregate data including the vehicle speeds of the first vehicle, the lead vehicle, and/or other vehicles. As such, the vehicle speed data received from the lead vehicle at Block 520 may be aggregated with the vehicle speed data associated with the first vehicle, and the aggregate speed data may be relayed to the following vehicle over the second ad hoc wireless connection at Block 530. For example, the aggregate speed data may be used to indicate traffic congestion based on the set of vehicle speeds included therein. In addition, the aggregate speed data may be used to determine a constant speed that the following vehicle may maintain to reduce and/or avoid heavy braking, which may also provide improved fuel efficiency for the following vehicle. Furthermore, emergency and/or accident information may be received from the lead vehicle over the first ad hoc wireless connection at Block 520, and the emergency and/or accident information may be relayed from the first vehicle to the following vehicle over the second ad hoc wireless connection at Block 530. Similarly, the emergency and/or accident information may be relayed to one or more other vehicles and/or fixed network access points to provide the emergency and/or accident information to the appropriate law enforcement and/or emergency personnel. As such, cooperative benefits may be provided to a plurality of vehicles by establishing ad hoc wireless connections between the vehicles based on their relative spatial relationships.

The flowcharts of FIGS. 4 and 5 illustrate the architecture, functionality, and operations of some embodiments of mobile ad hoc cooperative communication systems according to some embodiments of the present invention. In this regard, each Block may represent a module, segment, or a portion of code, which may comprise one or more executable instruction for implementing the specified logical functions. It should also be noted that in other implementations, the functions noted in the Blocks may occur out of the order noted in FIGS. 4 and 5. For example, two Blocks shown in succession may, in fact, be executed substantially concurrently, or the Blocks may be sometimes executed in the reverse order, depending on the functionality involved. Accordingly, some embodiments of the present invention provide methods and devices for determining a spatial relationship between mobile electronic devices and establishing an ad hoc wireless connection between the mobile electronic devices based on the determined spatial relationship. As such, information may be cooperatively transmitted, received, and/or relayed between mobile electronic devices based on the relative spatial relationships between the mobile electronic devices to benefit one or more of the devices. In the drawings and specification, there have been disclosed exemplary embodiments of the invention, and although specific terms are used, they are used in a generic and descriptive sense only and not for purposes of limitation, the scope of the invention being defined by the following claims.

That which is claimed:

1. A first device comprising:
 a processor; and
 memory communicatively connected with the processor, the memory comprising executable instructions that when executed by the processor cause the processor to effectuate operations comprising:
 establishing an ad hoc wireless connection with a second device;
 receiving, via the ad hoc wireless connection, information pertaining to a vehicle associated with the second device, wherein the information comprises data of spatial relationships associated with a vehicle associated with the first device and the vehicle associated with the second device;
 based on the information, determining a distance, speed, and position between the vehicle associated with the first device and the vehicle associated with the second device that determines the vehicle associated with the second device is moving at a greater speed than the vehicle associated with the first device and the vehicle associated with the second device is in a lane adjacent to the vehicle associated with the first; and based on the determining step, providing instructions to transmit lane change data of the vehicle associated with the first device to the vehicle associated with the second device.

2. The first device of claim 1, wherein the information further comprises speed data of a plurality of devices that comprise the first device and the second device, wherein the first device and the second device are mobile phones.

3. The first device of claim 1, the operations further comprising:
receiving, via the ad hoc wireless connection, data from the second device, wherein content of the data is based upon the spatial relationship.

4. The first device of claim 1, the operations further comprising:
altering at least one of vehicle speed, direction of travel, or a safety system of a vehicle associated with the first device based on the received information.

5. The first device of claim 1, the operations further comprising:
transmitting, via the ad hoc wireless connection, emergency data for a vehicle associated with the first device to the second device, wherein the transmitting of the emergency data is based on involvement in an accident of the vehicle associated with the first device.

6. The first device of claim 1, the operations further comprising:
transmitting to the second device, via the ad hoc wireless connection, at least one of breaking or deceleration data for a vehicle associated with the second device.

7. The first device of claim 1, the operations further comprising:
detecting a third device within the predetermined distance;
determining a second spatial relationship of the third device relative to the first device; and
establishing a second ad hoc wireless connection with the third device rather than with the second device, based on the second spatial relationship.

8. A method comprising:
establishing, by a first device, an ad hoc wireless connection with a second device;
receiving, via the ad hoc wireless connection, information pertaining to a vehicle associated with the second device, wherein the information comprises data of spatial relationships associated with a vehicle associated with the first device and the vehicle associated with the second device;
based on the information, determining a distance, speed, and position between the vehicle associated with the first device and the vehicle associated with the second device that determines the vehicle associated with the second device is moving at a greater speed than the vehicle associated with the first device and the vehicle associated with the second device is in a lane adjacent to the vehicle associated with the first; and
based on the determining step, transmitting lane change data of the vehicle associated with the first device to the vehicle associated with the second device.

9. The method of claim 8, further comprising:
providing, via the ad hoc wireless connection, data to the second device, wherein content of the data is based upon the spatial relationship.

10. The method of claim 8, further comprising:
receiving, via the ad hoc wireless connection, data from the second device, wherein content of the data is based upon the spatial relationship.

11. The method of claim 8, further comprising:
altering at least one of vehicle speed, direction of travel, or a safety system of a vehicle associated with the first device based on the received information.

12. The method of claim 8, further comprising:
transmitting, via the ad hoc wireless connection, emergency data for a vehicle associated with the first device to the second device, in which a motion vector indicates that the second device is approaching the first device.

13. The method of claim 8, further comprising:
transmitting to the second device, via the ad hoc wireless connection, at least one of breaking or deceleration data for a vehicle associated with the second device, in which a motion vector indicates that the second device is traveling behind the first device and in a same direction as the first device.

14. The method of claim 8, further comprising:
detecting a third device within the predetermined distance;
determining a second spatial relationship of the third device relative to the first device; and
establishing a second ad hoc wireless connection with the third device rather than with the second device, based on the second spatial relationship.

15. A tangible computer readable storage medium that is not a propagating signal, the computer readable storage medium comprising executable instructions that when executed by a processor cause the processor to effectuate operations comprising:
establishing, by a first device, an ad hoc wireless connection with a second device;
receiving, via the ad hoc wireless connection, information pertaining to a vehicle associated with the second device, wherein the information comprises data of spatial relationships associated with a vehicle associated with the first device and the vehicle associated with the second device;
based on the information, determining a distance, speed, and position between the vehicle associated with the first device and the vehicle associated with the second device that determines the vehicle associated with the second device is moving at a greater speed than the vehicle associated with the first device and the vehicle associated with the second device is in a lane adjacent to the vehicle associated with the first; and
based on the determining step, providing instructions to transmit lane change data of the vehicle associated with the first device to the vehicle associated with the second device.

16. The tangible computer readable storage medium of claim 15, the operations further comprising:
providing, via the ad hoc wireless connection, data to the second device, wherein content of the data is based upon the spatial relationship.

17. The tangible computer readable storage medium of claim 15, the operations further comprising:
receiving, via the ad hoc wireless connection, data from the second device, wherein content of the data is based upon the spatial relationship.

18. The tangible computer readable storage medium of claim 15, the operations further comprising:

altering at least one of vehicle speed, direction of travel, or a safety system of a vehicle associated with the first device based on the received information.

19. The tangible computer readable storage medium of claim 15, the operations further comprising:

transmitting, via the ad hoc wireless connection, emergency data for a vehicle associated with the first device to the second device, in which a motion vector indicates that the second device is approaching the first device.

20. The tangible computer readable storage medium of claim 15, the operations further comprising:

transmitting to the second device, via the ad hoc wireless connection, at least one of breaking or deceleration data for a vehicle associated with the second device, in which a motion vector indicates that the second device is traveling behind the first device and in a same direction as the first device.

* * * * *